United States Patent [19]

Tanaka et al.

[11] Patent Number: 4,903,252

[45] Date of Patent: Feb. 20, 1990

[54] DISC FILE APPARATUS

[75] Inventors: Katsufusa Tanaka; Takeo Motoyoshi; Tohru Yamashita; Naoyuki Nakatsukasa; Takaharu Takematsu, all of Amagasaki, Japan

[73] Assignee: Mitsubishi Denki Kabushiki Kaisha, Tōkyo, Japan

[21] Appl. No.: 160,272

[22] Filed: Feb. 25, 1988

[30] Foreign Application Priority Data

| Feb. 27, 1987 | [JP] | Japan | 62-27329[U] |
| Apr. 7, 1987 | [JP] | Japan | 62-86111 |
| Apr. 28, 1987 | [JP] | Japan | 62-105864 |
| May 7, 1987 | [JP] | Japan | 62-112825 |
| Jun. 26, 1987 | [JP] | Japan | 62-157821 |
| Aug. 6, 1987 | [JP] | Japan | 62-198473 |
| Aug. 6, 1987 | [JP] | Japan | 62-198472 |
| Sep. 24, 1987 | [JP] | Japan | 62-147138[U] |

[51] Int. Cl.⁴ .......................... G11B 5/78; G11B 17/00
[52] U.S. Cl. ................... 369/36; 360/98.06; 360/99.03; 360/99.07
[58] Field of Search .................. 369/34, 36, 38; 360/98.04, 98.06, 99.02, 99.03, 99.06, 99.07

[56] References Cited

U.S. PATENT DOCUMENTS

| 4,502,133 | 2/1985 | Siryj et al. | 369/34 |
| 4,504,936 | 3/1985 | Faber et al. | 369/36 |
| 4,527,262 | 7/1985 | Manto | 369/38 |
| 4,742,504 | 5/1988 | Takasuka et al. | 369/36 |
| 4,757,401 | 7/1988 | Teranishi | 360/99.06 |
| 4,827,463 | 5/1989 | Motoyoshi et al. | 369/36 |

Primary Examiner—Steven L. Stephan
Attorney, Agent, or Firm—Burns, Doane, Swecker & Mathis

[57] ABSTRACT

A disc file apparatus which holds a cartridge at both surfaces thereof through a slit formed from an open end to a closed end of a bill-like-shaped cartridge holder, clamps by clampers the cartridge at both lateral sides thereof, and renders the axis of rotation of a pick-up and discharge mechanism shifted from the center of gravity thereof so as to regulate rotation of the cartridge holder by a stopper in a range of an angle of 180°, whereby when the catridge is turned over or even when the same is subjected to an impact from the exterior, the cartridge is reliably held so that there is no fear that the rotational position thereof is shifted. The disc file apparatus uses linear ball bearing at each movable part and makes stand-by the utmost end of the clamper as close as possible to a stocker or a recording and reproducing system, thereby improving the processing speed as a whole, and furthermore temporarily makes stand-by the cartridge discharged from the recording and reproducing system just above an insertion and discharge port thereof by a transfer mechanism, thereby enabling a processing time to be reduced when a plurality of cartridges are continuously fed to the recording and reproducing system.

12 Claims, 18 Drawing Sheets

DISC FILE APPARATUS

BACKGROUND OF THE INVENTION

1. Field of the Invention

This invention relates to a disc file apparatus which is so constructed that a cartridge housing therein a large capacity storage medium, such as a magnetic disc, is retrieved from a stocker storing therein the cartridge and mounted in a recording and reproducing system, and reversely fetched therefrom and inserted into a predetermined location at the stocker.

2. Description of the Prior Art

FIG. 1 is a schematically perspective structural view of the conventional disc file apparatus as a whole disclosed in the Japanese Utility Model Laid-Open No. sho 61-170157 (1986), FIG. 2 is a perspective structural view concretely showing the principal portion of a cartridge pick-up and discharge mechanism at the disc file apparatus shown in FIG. 1, and FIG. 3 is a perspective view of a carriage for moving the cartridge pick-up and discharge mechanism.

In FIG. 1, a reference numeral 1 designates a cartridge housing therein a disc of an information recording medium, which is transversely arranged lengthwise standing on a rack provided at a stocker 2, 3 designates a recording and reproducing system for reading and writing the information on the disc in the cartridge 1, 4 designates a pick-up and discharge mechanism for the cartridge 1, which is mounted rotatably through a rotary mechanism provided at a laterally moving base 5 provided on a vertically movable carriage 6 and functions to insert the cartridge into or draw out of the stocker 2 or the recording and reproducing system 3, 7 designates two rod-like rails, being provided at the left and right side in parallel to each other, which are fitted slidably into sliders 8 respectively to vertically guide the carriage 6, and 9 designates belts connected to the carriage 6 and a balancer 11 so as to transmit thereto a driving force of a lifting motor 10 respectively.

In FIG. 3, a reference numeral 12 designates a connector for connecting the belts 9 to the carriage 6, 13 designates a motor for laterally moving the laterally moving base 5 in the direction 7 the arrow B and mounted on the carriage 6 by a fitting 14, 15 designates a worm gear mounted to the motor 13, 16 designates a worm wheel engageable with the worm gear 15, 17 designates a shaft through which a torque is transmitted from the worm wheel 16 to a pulley 18, 19 designates a belt which engages with the pulley 18, a part of the loop of belt 19 being mounted to the laterally moving base through a belt fitting 22, 20 designates two rod-like rails, extending in vertically parallel to each other, which are fitted slidably into sliders 21 mounted on the laterally moving base 5, both ends thereof being mounted to the carriage 6, 23 designates a motor for rotating the pick-up and discharge mechanism 4 mounted to the laterally moving base 5, and 25 designates a worm gear mounted on the end of a shaft of the motor 23 and engageable with a worm wheel 26 rotatably mounted on a bearing member 27 provided at the laterally moving base 5.

The worm wheel 26 is mounted on a holder 28 at the pick-up and discharge mechanism 4 with the axis A of rotation as the center of rotation; resulting in that the motor 25 rotates to rotate the holder 28.

In FIG. 2, a reference numeral 29 designates a moving member having at the lower surface a slider (not shown) slidable onto a guide shaft 30 mounted to the holder 28 longitudinally thereof and at the upper surface a mechanism for longitudinally moving the moving member 29 and a cartridge holding mechanism 39, 31 designates a motor for longitudinally moving the moving member 29 which is mounted to a bearing base 32 fixed to the moving member 29, 34 designates a worm gear mounted to the motor 31, and 35 designates a worm wheel which engages with the worm gear 34, and is mounted to a synchro-shaft 36. The synchro-shaft 36 is mounted rotatably to the bearing base 32 and that 33 provided at both sides of the moving member 29, and provided at both axial ends with rollers 38 rotatable in guide grooves 38c provided at the holder 28 to draw-in the cartridge, and with pinions 37 engageable with racks 38d provided at the sides of the guide grooves 38c respectively.

Therefore, the moving member 29 can move in a fixed posture due to the guide shaft 30 and the rollers 38 rotatably engageable with the guide grooves 38c provided at the holder 28 to draw in the cartridge 1.

Also, a reference numeral 40 designates a pair of clampers which thicknesswise open and close to clamp the cartridge 1, 41 designates a support for rotatably supporting the clampers 40 and a cam shaft 42, 43 designates a bearing base to which the pair of clampers 40 and cam shaft 42 and a motor 44 are mounted, 45 and 46 designate gears for transmitting the rotation of motor 44 to the cam shaft 42, and 47 designates a tension spring for applying a clamping force to the clamps 40, being connected thereto.

In the state where the pair of clampers 40 are open as shown in FIG. 2, when the cam shaft 42 rotates at an angle of 90°, the clampers 40 are biased to hole the cartridge 1 by means of a spring force.

Also, a reference numeral 38a designates an inlet for the cartridge 1, 38b designates a bore through which the clampers 40 pass, and 48 designates a stopper to about against the front surface of cartridge 1, which is supported by a spring 49 elastically to the moving member 29.

Next, explanation will be given on operation of the aforesaid conventional disc file apparatus.

The disc file apparatus operates to selectively pick up the cartridge 1 housed in the stocker 2 so as to insert it into the recording and reproducing system, or operates reversely to the above and returns the cartridge 1 to the original position. Explanation will be given on, for example, a case where a cartridge 1a shown in FIG. 1 is supplied to a recording and reproducing system 3A.

At first, when the apparatus is given a command of taking the cartridge 1a out of the stocker 2 to insert it into the recording and reproducing system 3A, a controller (not shown) housed in the apparatus drives a motor 10 for lifting or lowering the carriage 6, the motor 13 for laterally moving the laterally movable base 5, and the motor 23 for rotating the holder 28 so that the pick-up and discharge mechanism 4 moves until the cartridge inlet 38a provided at the holder 28 constituting the pick-up and discharge mechanism 4 is opposite to and in alignment with a desired cartridge 1a (in the stocker) 2.

Next, the motor 44 is driven to rotate the cam shaft 42 to open the clampers 40, the motor 31 is driven to move the moving member 29 having a clamp mechanism 39 to the position where the clampers 40 can clamp the cartridge 1a within the stocker 2, the motor 44 is driven to rotate the cam shaft 42 by an angle of 90° so as to clamp by the clampers 40 the front part of cartridge 1a through the spring force of tension spring 47, and then the motor 31 is reversely rotated so as to take the cartridge 1a into the mechanism 4 through the guide grooves 38c provided at the holder 28.

Upon completing the take-in of the cartridge 1a, the holder 28 therefor is rotated by an angle of 90° by the motor 23 in accordance with an instruction of selecting either surface of the cartridge 1, and simultaneously the motors 13 and 10 are driven to move the pick-up and discharge mechanism 4 to the position where an insertion port 3B at the recording and reproducing system 3A is opposite to and coincident with the cartridge inlet 38a at the holder 28.

Then, the motor 31 is normally rotated to forwardly move the clampers 40 and the cartridge 1a is inserted into the recording and reproducing system 3. Upon completing the insertion of cartridge 1a, a signal of completion of insertion thereof into the system 3 is given and simultaneously the motor 44 is driven to open the clampers 40 and the motor 31 is reversely rotated to backwardly move the clampers 40.

Meanwhile, the inserted cartridge 1a is further drawn into the recording and reproducing system 3 through draw-in means (not shown) provided therein toward the position where the information can be recorded or reproduced. Upon completion of recording or reproducing, the cartridge 1a is returned to the original position thereof in the stocker 2, and at that time the apparatus operates reversely to the above.

Next, the apparatus is given a command to pick up the next cartridge 1b housed in the stocker 2 and insert it into the recording and reproducing system 3, so that the same operation as the above-mentioned is carried out to convey the cartridge 1b to the recording and reproducing system 3.

When a plurality of cartridges 1 are fed to the recording and reproducing system 3, the above-mentioned operation is continuously repeated.

The cartridge pick-up and discharge mechanism at such conventional disc file apparatus is constructed to draw in the cartridge while slidably holding both side surfaces thereof, whereby the mechanism is larger and heavy so as to increase the moment of inertia. Hence, it is required that the bearing structure must be strengthened and the power of motor be increased.

Also, since it is difficult to dispose mechanical parts required for insertion and removal of cartridge in proper balance with the rotary shaft in cantilever fashion, a problem is created in that vibrations are generated when the cartridge pick-up and discharge mechanism rises or falls and laterally moves as well as rotating, whereby it is difficult to move the mechanism at a high speed.

Since the conventional disc file apparatus merely clamps by the clampers the cartridge in the thickness direction thereof, it is difficult to properly hold the cartridge, so that there is a fear that the cartridge will hit the stocker or the recording and reproducing system to cause a failure.

All the rise and fall of the carriage with respect to the main body of the apparatus, lateral movement of the lateral movable base with respect to the carriage, and longitudinal movement of the moving member carrying the holding mechanism for the cartridge with respect to the holder are adapted to be slidably guided by the ring-like-shaped sliders fitted on the rod-like rails.

Hence, the above-mentioned movements are not smooth and the rails are supported only at both axial ends, thereby requiring strength, in other words, being large-sized and increasing the moment when viewed as the cantilever. Hence, there is the problem that when the apparatus is assembled, the sliders need to be previously fitted onto the rails respectively.

Furthermore, in order to turn over the cartridge, the pick-up and discharge mechanism is rotated by the worm gear and worm wheel, there is a fear that a backlash in the worm gear or vibrations from the exterior of apparatus brings about that the rotational position of the pick-up and discharge mechanism shifts and that the cartridge, when inserted into the stocker, hits the stocker at the front end of the cartridge. Therefore, a housing interval of the cartridge to the stocker must be longer, thereby reducing the number of cartridges to be housed as a whole.

Also, when the holder for the cartridge moves, the position of the clampers directly holding the cartridge, even when not holding the cartridge, is at the same position as when holding the same, where the taking in cartridge is completed, whereby its amount of movement is large to have a tendency of wasting time.

At the conventional disc file apparatus, the position where the cartridge housing therein the disc is inserted into the recording and reproducing system is the same as that where the cartridge is taken out of the recording and reproducing system. Hence, for example, after the cartridge is returned to the stocker, a new cartridge must be picked up from the stocker and then inserted to the recording and reproducing system, thereby creating the problem in that much time is wasted.

Furthermore, the conventional disc file apparatus cannot check whether or not the cartridge is inserted into the recording and reproducing system. Hence, there is a fear that in spite that the cartridge is already inserted into the recording and reproducing system, a new cartridge may be inserted therein to cause damage in the cartridge or the apparatus.

SUMMARY OF THE INVENTION

The present invention has been designed to solve the above problems. A first object of this invention is to provide a disc file apparatus which reliably holds by the clampers the cartridge to be kept in position.

A second object of this invention is to provide a disc file apparatus which can reliably hold the rotational position of a pick-up and discharge mechanism at the appointed position while the carriage is moving and even after the pick-up and discharge mechanism rotatably has moved.

A third object of this invention is to provide a disc file apparatus which can rapidly and smoothly move the cartridge between a stocker and a recording and reproducing system, thereby preventing the occurence of vibration causing a trouble.

A fourth object of this invention is to provide a disc file apparatus in which each part in the body of the apparatus is small-sized as much as possible to increase the number of cartridges to be housed in the stocker.

A fifth object of this invention is to provide a disc file apparatus in which each part in the body of the apparatus is small-sized as much as possible to minimize of the apparatus as a whole.

A sixth object of this invention is to provide a disc file apparatus which is easy to assemble rails and sliders to enable miniaturization of the apparatus.

A seventh object of this invention is to provide a disc file apparatus which reduces a spaced interval between the fore end of each damper and the stocker, thereby enabling the cartridge to be rapidly mounted to the recording and reproducing system and housed into the stocker.

A eighth object of this invention is to provide a disc file apparatus in which the position where the cartridge is inserted into the recording and reproducing system is different from that where the same is retrieved therefrom, thereby enabling reduction in the processing time when the cartridge is continuously fed to the recording and reproducing system.

A ninth object of this invention is to provide a disc file apparatus which can reduce a load of the moving member, such as the carriage, with respect to the rails, thereby maintaining high accuracy.

A tenth object of this invention is to provide a disc file apparatus which is provided with a sensor detecting that the cartridge is inserted in the recording and reproducing system, thereby enabling a malfunction to be avoided.

The disc file apparatus of this invention is provided with at least one stocker housing in juxtaposition a plurality of cartridges each housing therein an information storage medium and having at both side surfaces recessed engaging portions respectively; at least one recording and reproducing system disposed in such a manner that a first direction of taking or housing said cartridge out of or into said stocker is parallel to the direction of inserting or discharging said cartridge into or from said recording and reproducing system, thereby reading or recording the information from said storage medium; a carriage moving by being guided along rails extending in a second direction of juxtaposing said cartridges in said stocker; and pick-up and discharge means for said cartridge, which has a cartridge holder to hold said cartridge, move said cartridge holder in the first direction so as to pick-up said cartridge from said stocker, inserts said cartridge into an insertion/discharge port of said recording and reproducing system, reversely takes out said cartridge discharged from said recording and reproducing system, and houses said cartridge into said stocker at a predetermined position therein, has a function for turning over said cartridge, and is supported by said carriage and said pick-up and discharge means is provided with a cartridge holder which is provided at one end with an opening and formed at the other end in a bill-like shape, said opening being opposite to the front surface of said cartridge housed in said stocker, said closed end being supported by said carriage to be rotatable around the axis parallel to the first direction; a moving member movable in parallel to the first direction between said opening and said closed end at said cartridge holder; and a clamping mechanism mounted on said moving member and engageable with said engaging portion at said cartridge, thereby clamping said cartridge.

The above and further objects and features of the invention will more fully be apparent from the following detailed description with accompanying drawings.

DESCRIPTION OF THE PREFERRED EMBODIMENTS

Next, the present invention will be detailed with reference to the accompanying drawings showing an embodiment of the invention.

Figure 1:
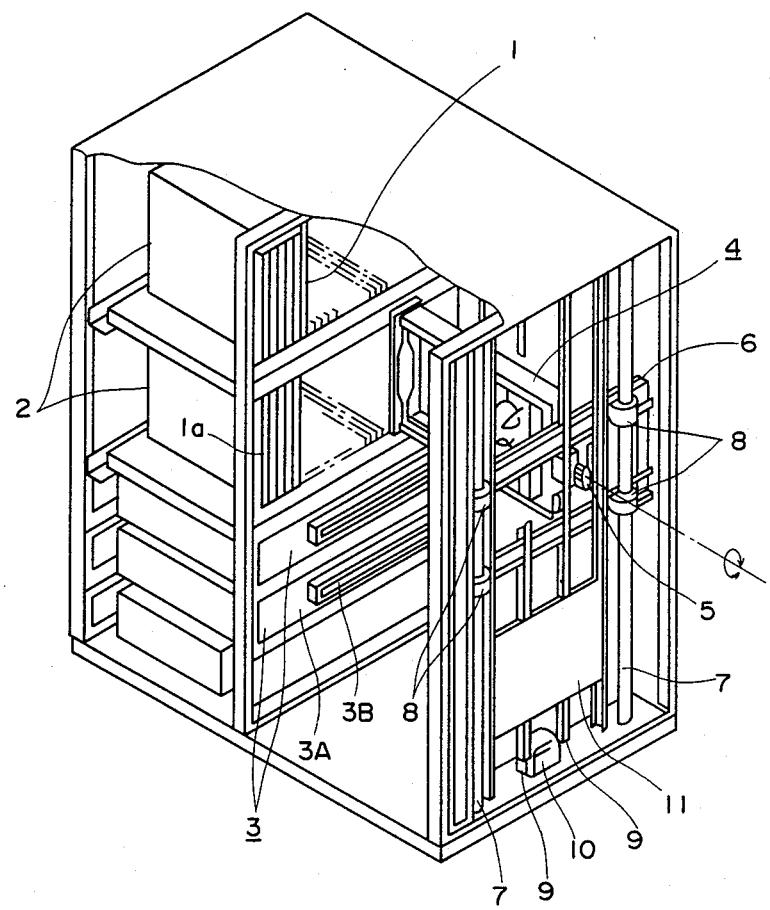
FIG. 1 is a perspective structural view of a conventional disc file apparatus.
Figure 2:
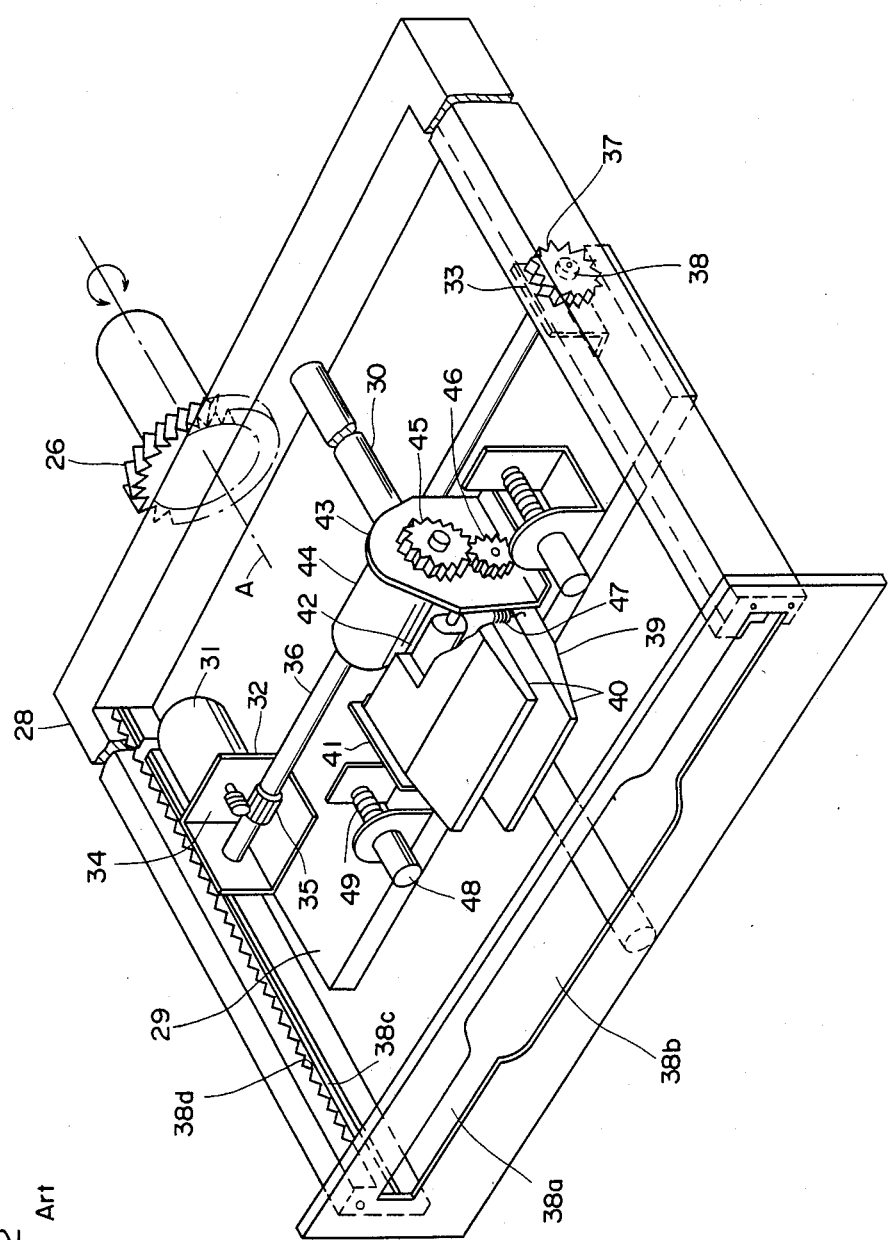
FIG. 2 is a perspective view of a pick-up and insertion mechanism thereof.
Figure 3:
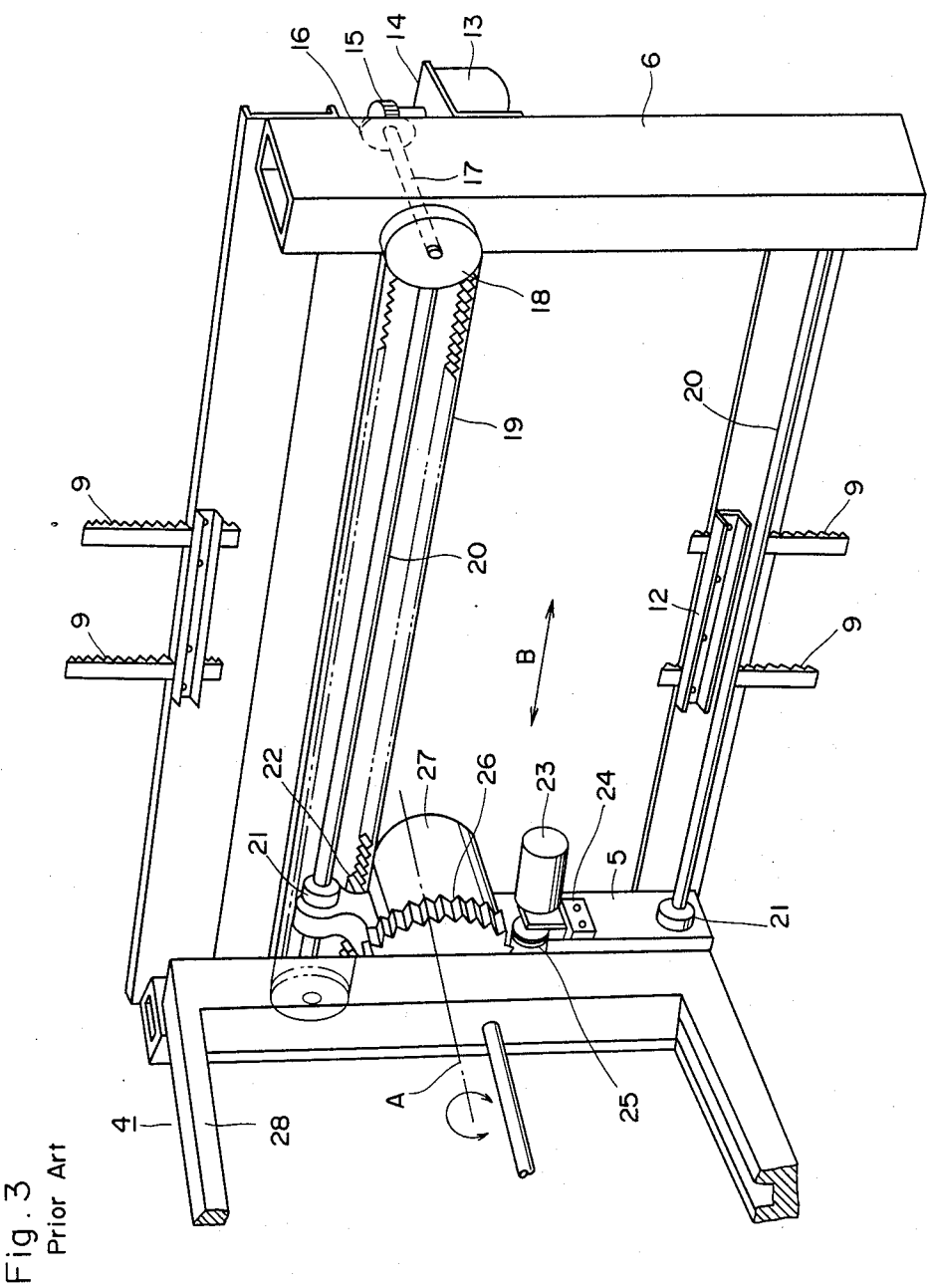
FIG. 3 is a view of an exemplary carriage for the pick-up and insertion mechanism shown in FIG. 2.
Figure 4:
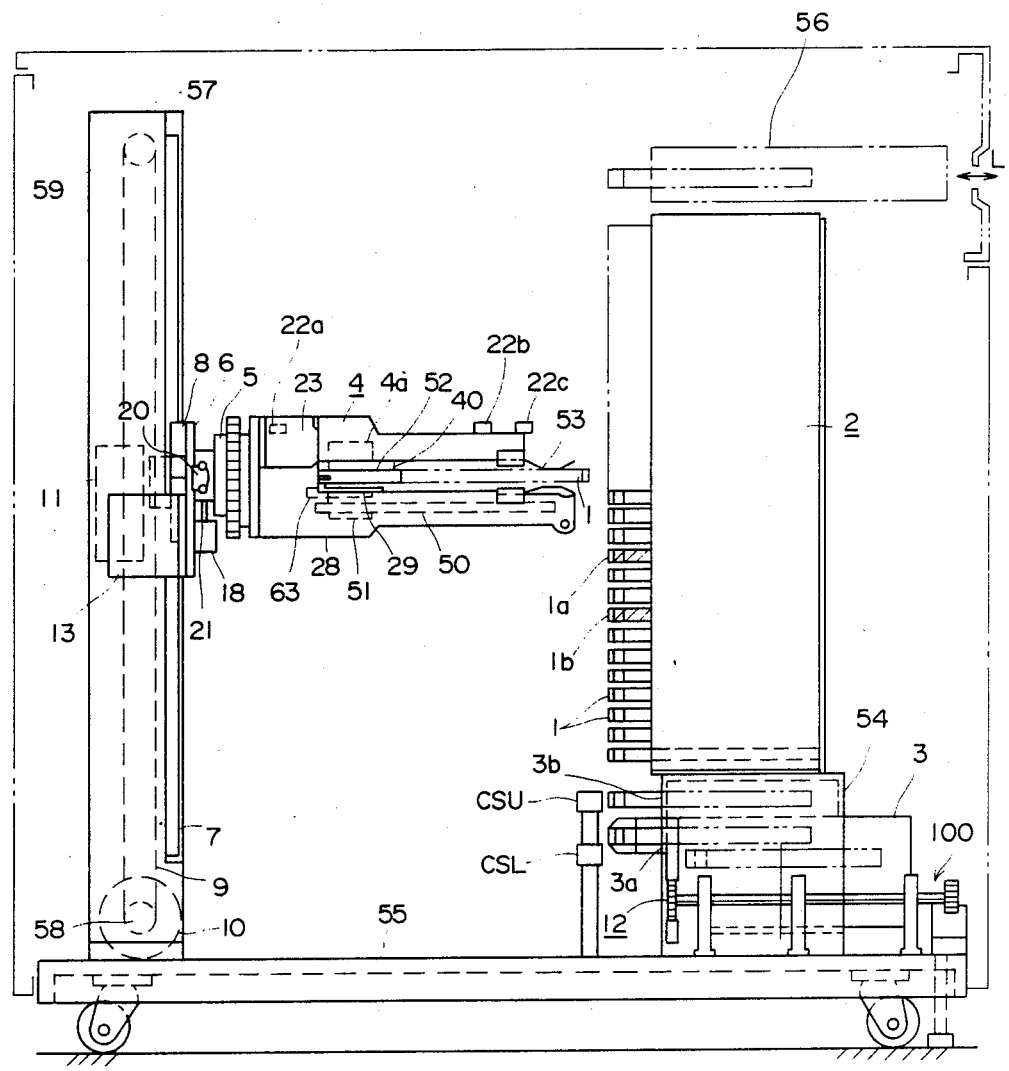
FIG. 4 is a side view of an embodiment of a disc file apparatus of the invention.
Figure 5:
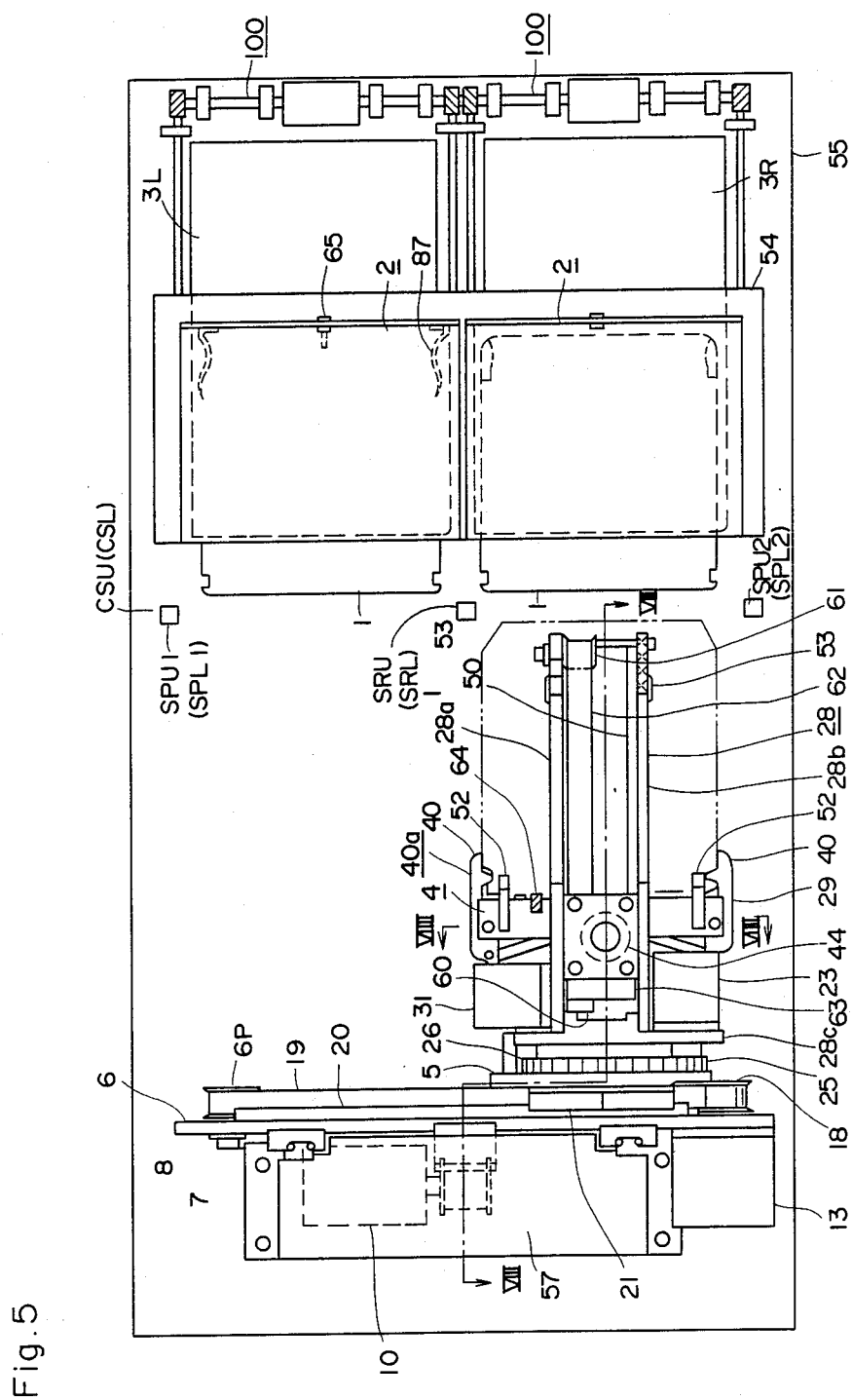
FIG. 5 is a plan view of the embodiment shown in FIG. 4.
Figure 6:
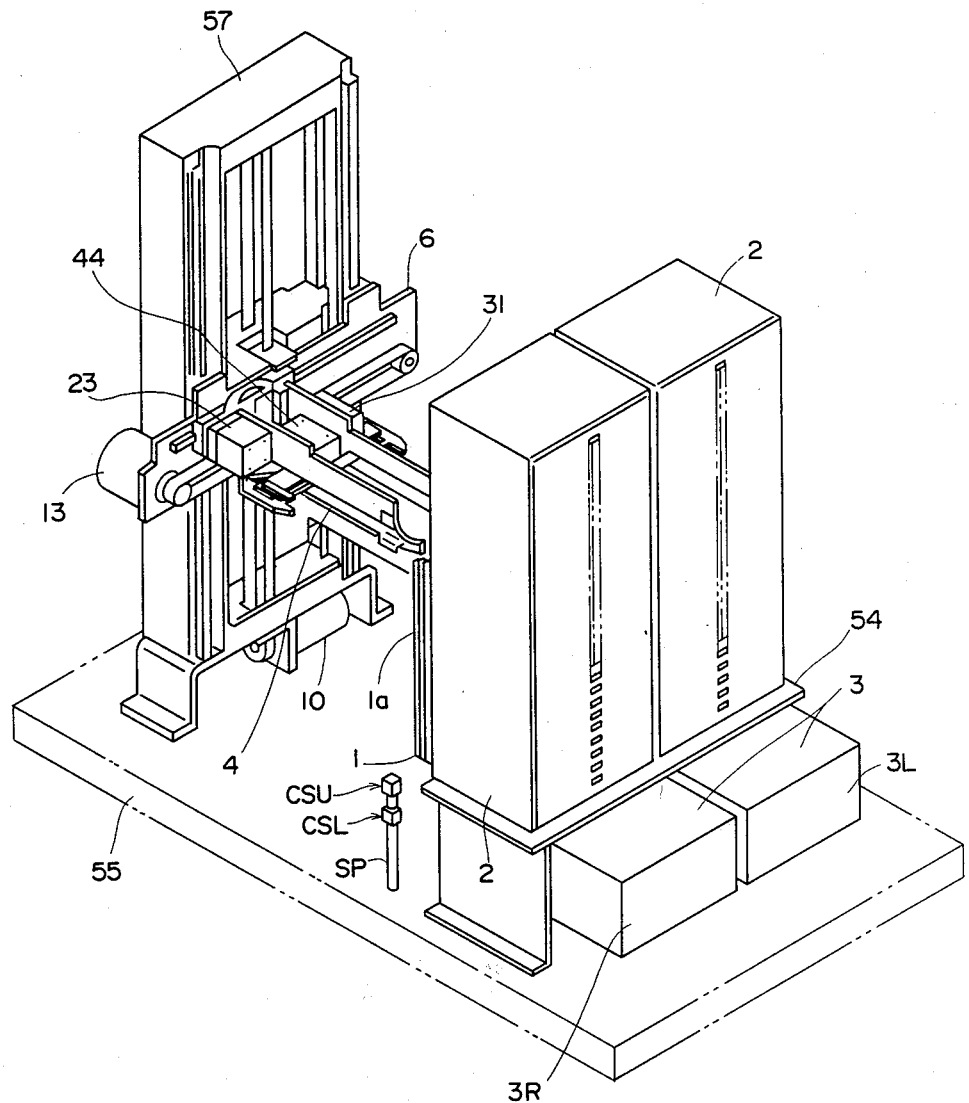
FIG. 6 is a perspective view of the same.

FIG. 4 is a side view of the entire construction of a disc file apparatus of the invention, FIG. 5 is a plan view thereof, and FIG. 6 is a perspective view of the same.

In addition, the components the same as or corresponding to those in the aforesaid conventional disc file apparatus are designated by the same reference numerals.

In the drawing, a reference numeral 1 (including 1a and 1b) designates cartridges each housing therein an information storage medium, such as a magnetic disc the like, each one of plural of cartridges being placed horizontally and stored on a shelf provided in a stocker 2, and 3 designates a recording and reproducing system which reads out the information recorded in the magnetic disc in the cartridge 1 and writes the information in the same and is mounted on a frame 54 built-in on a base 55. In addition, in the embodiment of the disc file apparatus of the invention, two recording and reproducing systems 3 are laterally juxtaposed.

Also, the aforesaid stocker 2 is mounted on the frame 54.

In addition, the disc file apparatus of the invention is provided above the stocker 2 on the place shown with L with a mechanism 56 for taking in the cartridge 1 from the exterior, details of the mechanism 56 being omitted herein.

At the position level with a cartridge insertion/discharge port 3a for the recording and reproducing system 3 is provided a cartridge sensor CSL for detecting insertion of the cartridge 1 into the recording and reproducing system 3 and at the position level with a cartridge takeout port 36 is provided a cartridge sensor CSU for detecting discharge of cartridge 1 from the recording and reproducing system 3.

The cartridge sensor CSL (or CSU) disposes at a laterally intermediate position between both the insertion/discharge ports 3a (both the takeout ports 3b) a light-beam receiver SRL (or SRU) and at the outside positions of both the insertion/discharge ports 3a (takeout ports 3b) light-beam projectors SPL1 and SPL2 (or SPU1 and SPU2). The light-beam is projected from both the projectors SPL1 and SPL2 (or SPU1 and SPU2) toward the receiver SRL (or SRU) in the direction perpendicular to the cartridge inserting or discharging direction, thereby enabling the cartridge 1 to be detected of its insertion and discharge into and from the recording and reproducing system 3.

A pick-up and discharge mechanism 4 for the cartridge 1, which is to be discussed below, mainly comprises a holder 28 of a bill-like shape (to be hereinafter called a C-frame-like shape) and rotatable around the axis connecting an open end and a closed end. The holder 28 comprises a support member 28c having a turn-over shaft, and a pair of C-frame like members 28a and 28b having one open end and the other end which is closed and a slit therebetween, the open end being opposite to the cartridge 1, the closed end being mounted on a laterally movable base 5 in relation of being capable of turning over.

The laterally movable base 5 is mounted by sliders 21 and rails 20 movably to a carriage 6 in a cantilever fashion. The carriage 6 is mounted vertically movably through two sets of sliders 8 and rails 7 mounted on a column 57. A motor 10 for lifting and lowering the carriage 6 is mounted at the lower portion of column 57 and the carriage 6 is connected to a belt 9 being wound around a pulley 58 provided at one end of a motor shaft and a pulley 59 mounted rotatably on the upper portion of the column 57, thereby lifting and lowering the carriage 6. A balancer 11 is mounted on the belt 9 so as to reduce capacity of the motor 10. In addition, all the movable mechanism, such as pick-up and discharge mechanism 4 and laterally movable base 5 and the like, are mounted on the column 57.

Next, explanation will be given on clamper moving means at the pick-up and discharge mechanism 4 and laterally moving means and turnover means for the same.

In FIG. 4, the stocker 2 and recording and reproducing system 3 are disposed in two rows so as to carry out more and further quick recording and reproducing, whereby the pick-up and discharge mechanism 4 requires lateral movement. In FIG. 5, a motor 13 for lateral movement thereof is mounted directly on one end of the carriage 6 so as to laterally move the laterally movable base 5 connected to a belt 19 being wound around a pulley 18 mounted on one end of the motor shaft and a pulley 6P mounted rotatably on the other end of the carriage 6. At the center of the laterally movable base 5 are fixed a main shaft (to be discussed below) and a gear 26 required to turn over the pick-up and discharge mechanism 4, the main shaft supporting a member 28c at the closed end side of the C-frame-like holder 28 in relation of being turnable-over through cross roller bearing (to be discussed below).

Also, a motor 23 required for turning over the member 28c is mounted thereon and a pinion 25 is mounted on a motor 23 shaft end and engages with a gear 26. In other words, the motor 23 while rotating revolves around the gear 26. The reason for the above construction is that is to be well balanced when the turn-over is carried out and wirings of the motor 23 and pick-up and discharge mechanism are collected to be facilitated.

Meanwhile, sensors (to be discussed below) for checking the turn-over are also provided at the turned-over side.

Next, explanation will be given on the moving method for the clamp mechanism. The clamp mechanism comprises a moving member 29, the C-frame-like holder 28 provided thereon, a thin plate member 28a constituting the holder 28, a motor 31 mounted directly to the thin plate member 28a at the closed end side of the holder 28, a belt 62 transported across a pulley 60 mounted on the member 28a at the open end side of the holder 28, and a support 63 provided under the moving member 29 and connected to the belt 62, thereby longitudinally moving the moving member 29 toward or away from the stocker 2.

Also, the support 63, as shown in FIG. 4, carries a slider 51 which is slidably movable along a rail 50 mounted on the member 28b at the holder 28. In FIG. 5, a reference numeral 64 designates a sensor mounted on the moving member 29 and for detecting the front surface of the cartridge 1, 65 designates a sensor mounted to the rear of each stocker 2 and for detecting the rear surface of the cartridge 1, and 87 designates holding springs provided at both sides of each shelf at each stocker 2 and for stably holding the cartridge 1 therein.

Figure 7:
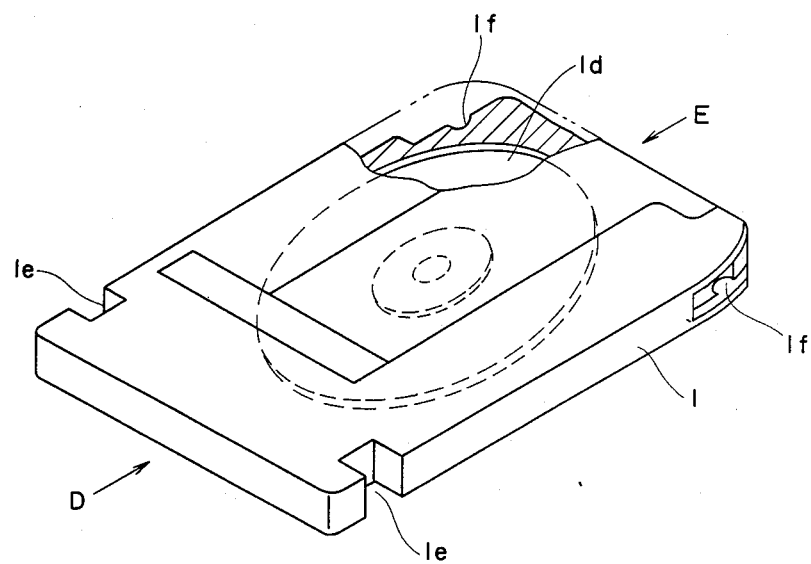
FIG. 7 is a schematic view exemplary of a cartridge.

FIG. 7 is an exterior view of the cartridge 1. The cartridge 1 is provided at both sides of the front (the arrow D side) thereof with retainer recesses 1e respectively. At the rear position of the side (the E side shown with an arrow) are provided gently curved portions for facilitating insertion of the cartridge 1 therethrough into the stocker 2 or the recording and reproducing system 3. Also, at both the curved portions are provided semicircular recesses 15 used for taking therethrough the cartridge 1 into the body of the recording and reproducing system 3. Such configuration is promoted to be standardized in common with manufactures. In addition, a reference numeral 1d shown in FIG. 7 designates a disc as an information storage medium.

Figure 8:
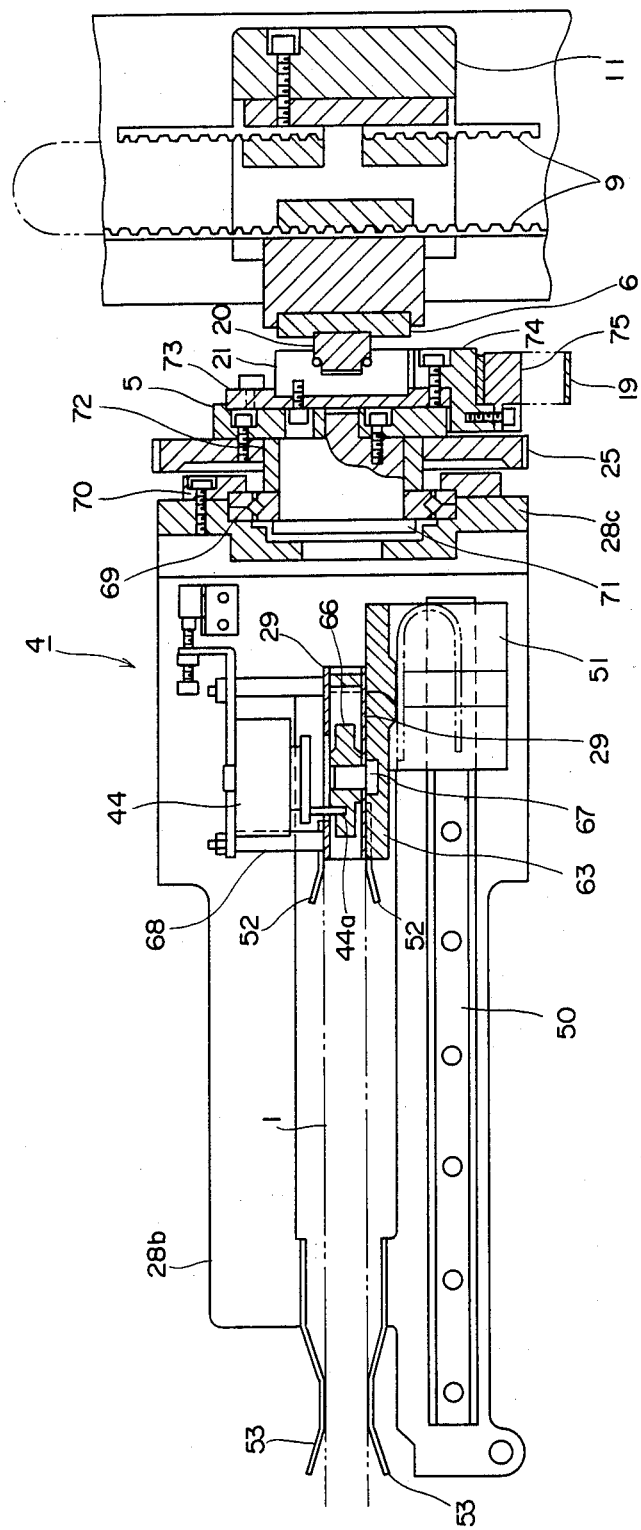
FIG. 8 is a side view of pick-up and insertion mechanism shown by the line VIII—VIII 6 in FIG. 5.

Next, the pick-up and discharge mechanism 4 will be detailed with reference to the FIG. 8 side view and FIG. 9 front view.

In the drawing, a reference numeral 53 designates guides mounted on the utmost ends of the holder 28 and guiding the cartridge 1 thicknesswise thereof, the guides 53 serving to relieve through the expanded utmost ends of a leaf spring an impact by the front corner of cartridge 1 when drawn into the holder 28, and 52 designates guides mounted on the moving member 29 formed of two thin plates and formed of leaf springs and expanded at the utmost ends in the same way as the guides 53. The guides 52 serves to prevent the cartridge 1 from inclining at the fulcrum of the guide 53 and to clamp and take out the cartridge 1 with ease even when it cannot be accurately vertically positioned by the lifting means, because the guides 52 at first clamp up the front part of the cartridge 1 when vertically arranged on the shelf at the stocker 2.

A swinging lever 66 to be discussed below has at the outer periphery a link connected thereto, the link being connected to a hook 40 so that the swinging lever 66 swings to open and close the hook 40 and rotates around a pin 67 mounted by the support base 63 and moving member 29.

On the other hand, the swinging lever 66 swings through engagement with a retainer pin 44a provided at a rotor portion of a swinging motor 44 which is of electromagnetic type and, when energized, rotates only at a predetermined range of an angle of 33° in this embodiment. The swinging motor 44, when deenergized, is returned to the original position by means a flat spiral spring set in the motor 44.

In addition, swinging motor 44 is mounted by the supporting bolt on the moving member.

A member 28c forms the holder 28 and is mounted to an outer race of a cross roller bearing 69 by a bearing holder 70. An inner race at the cross roller bearing 69 is mounted on a main shaft 71 in condition of being restricted by a collar 72 from rotation with respect to the main shaft 71. Also, the main shaft 71 is mounted on the laterally movable base 5 which is mounted on a plate 73 carrying a slider 21. A belt holder 74 is mounted on the mounting plate 73 and a belt clamper 75 clamps part of the laterally moving belt 19 so that the pick-up and discharge mechanism 4 and laterally moving base 5 having the turn-over shaft move along the rails 20 mounted on the carriage 6.

The support 63 provided below the moving member 29 carries a slider 51 so that the slider 51 and a rail 50 mounted on the holder 28b make the moving member 29 and clamping means lengthwise movable.

Figure 9:
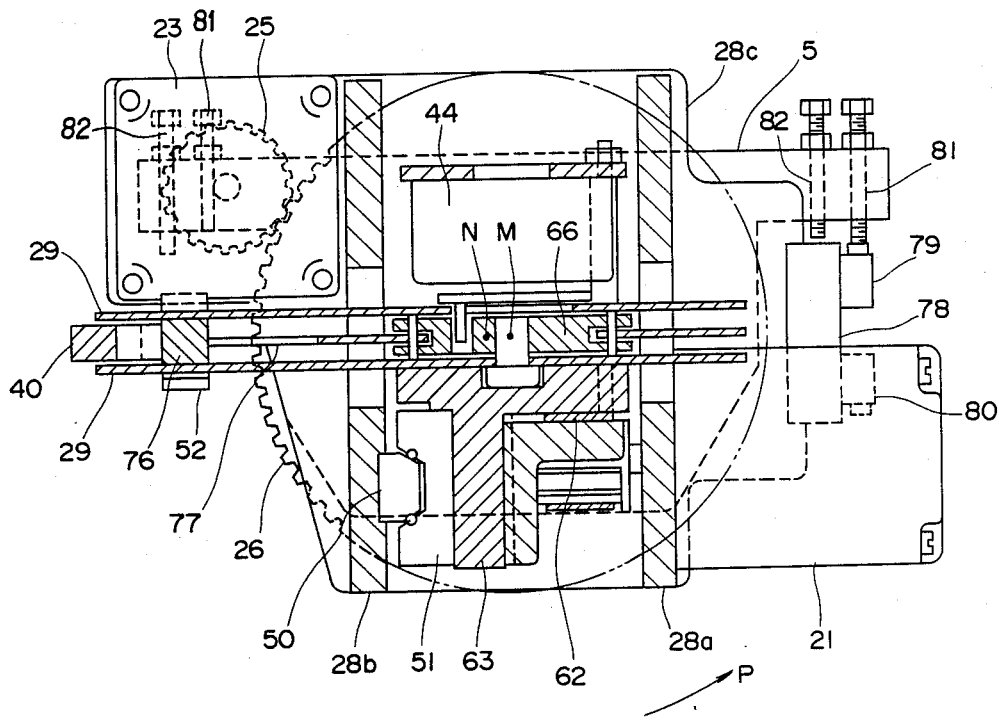
FIG. 9 is a front view thereof shown by the line VIIII—VIIII in FIG. 5.
Figure 10:
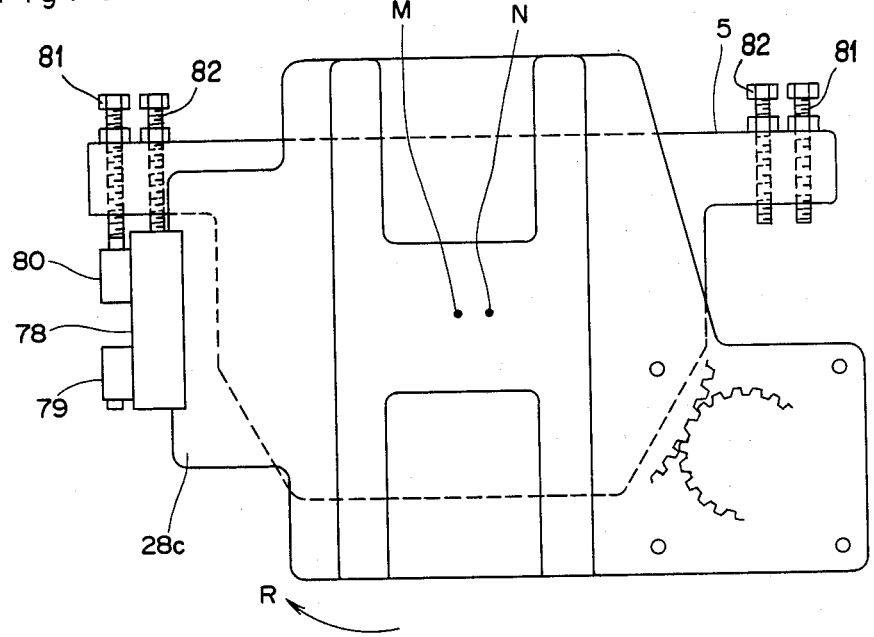
FIG. 10 is a typical view showing the relation between a rotary shaft and the center of gravity of the pick-up and discharge mechanism.

FIGS. 9 and 10 are elevation views showing the relation between the axis of turn-over and the center of gravity at the pick-up and discharge mechanism 4, in which the point M is the center of turn-over and N is the center of gravity of entire parts to be turned-over and is biased slightly (in FIG. 9) from the point M, the parts not to be turned-over in the state shown are the laterally movable base 5 and gear 26 only. FIG. 9 shows the state where the pinion 25, mounted on a shaft end of a motor 23 engaged with the gear 26, rotates and turns-over the pick-up and discharge mechanism 4 in the direction of the arrow P.

A stopper 78 mounted on one member 28c at the holder 28 is kept its position by adjusting screws 82, 82 mounted at the laterally movable base 5. At that state sensors 79, 80 provided at the stopper 78 is adjusted by adjusting screws 81, 81 to be in condition of detecting the just turned-over position.

Now, explanation will be given on the reason why the center of gravity N of the turn-over parts is biased slightly leftwardly from the center of turn-over in FIG. 9.

If the center of gravity N coincides with the center M of turn-over, vibrations applied from the exterior accidentally rotates when housed into the stoker 2 or inserted into the recording and reproducing system 3, the pick-up and discharge mechanism 4 accidentally rotates around the center M of turn-over, thereby there being a fear that the utmost end of cartridge 1 hits the stoker 2 or the recording and reproducing system 3. Hence, the disc file apparatus of the invention shifts the center of gravity N slightly from the center M of turn-over at the pick-up and discharge mechanism 4 so that the center of gravity N is adapted to be movable only in the region above the horizontal line passing the center M of turn-over.

Accordingly, as shown in FIG. 10, when the center of gravity N is positioned rightwardly of the center M of turn-over, the pick-up and discharge mechanism 4 is subjected to a moment of always rotating the mechanism 4 in the direction of the arrow R. Hence, since the stopper 78 always abuts against the adjusting screw 82, there is no fear that the pick-up and discharge mechanism 4 accidentally rotates.

FIG. 10 is a schematic view showing the state where the pick-up and discharge mechanism 4 is turned-over from the state shown in FIG. 9, in which the center of gravity N is positioned rightwardly of the center M of turn-over, whereby the stopper 78 always abuts against the adjusting screw 82.

Next, explanation will be given on a clamp mechanism 40a provided at the moving member 29 with reference to FIGS. 11, 12 and 13.

Figure 11:
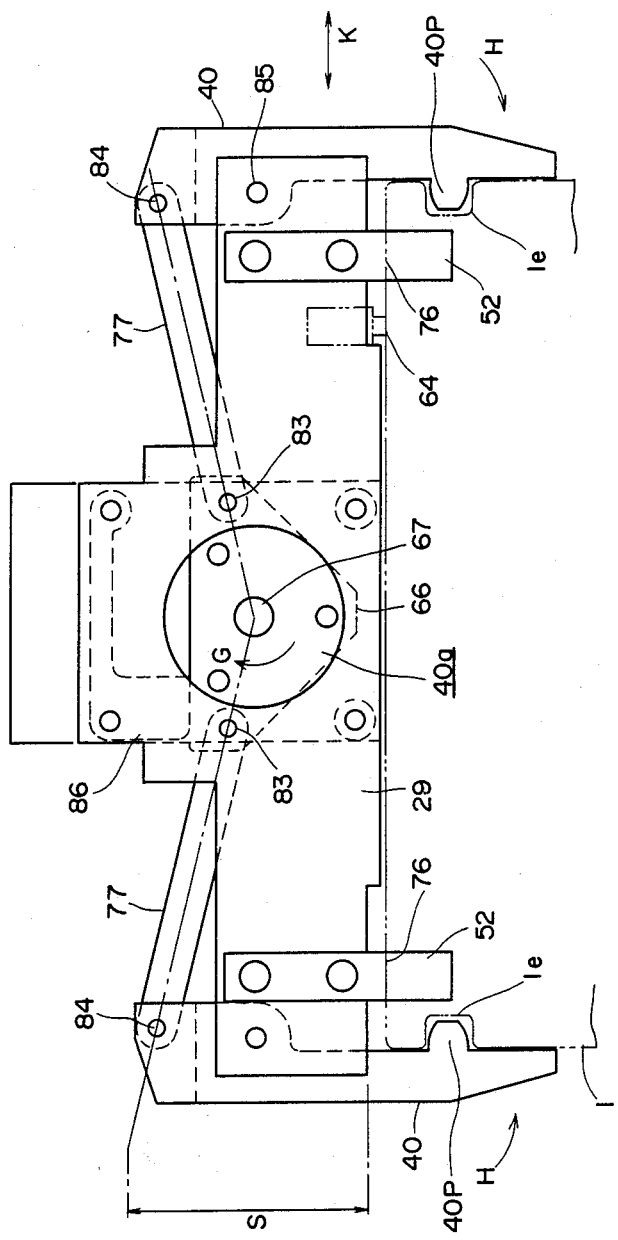
FIGS. 11 and 13 are plan views of a holding mechanism.

FIG. 11 shows the state where clampers 40 close to engage at the projections thereof with the recesses 1e at the cartridge 1 to thereby clamp it, the clampers 40 being constructed to be laterally symmetric with respect to the swinging lever 66. The reason for the construction above is that a distance S shown in FIG. 11 is reduced as much as possible and the holder 28 is formed as small as possible, thereby reducing a load on the cantilever supporting. Besides this, the entire apparatus of the invention is reduced in construction as much as possible.

Figure 12:
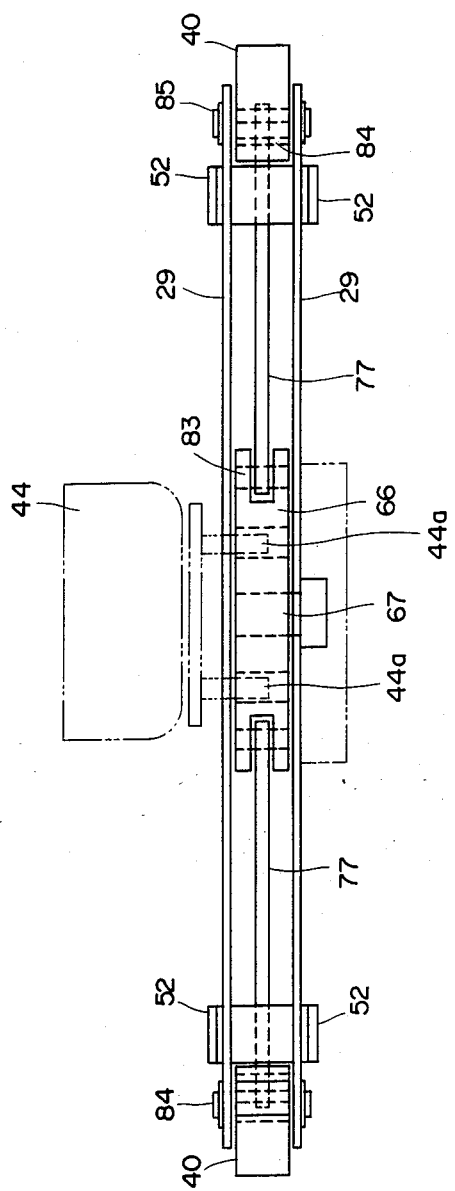
FIG. 12 is an elevation thereof.
Figure 13:
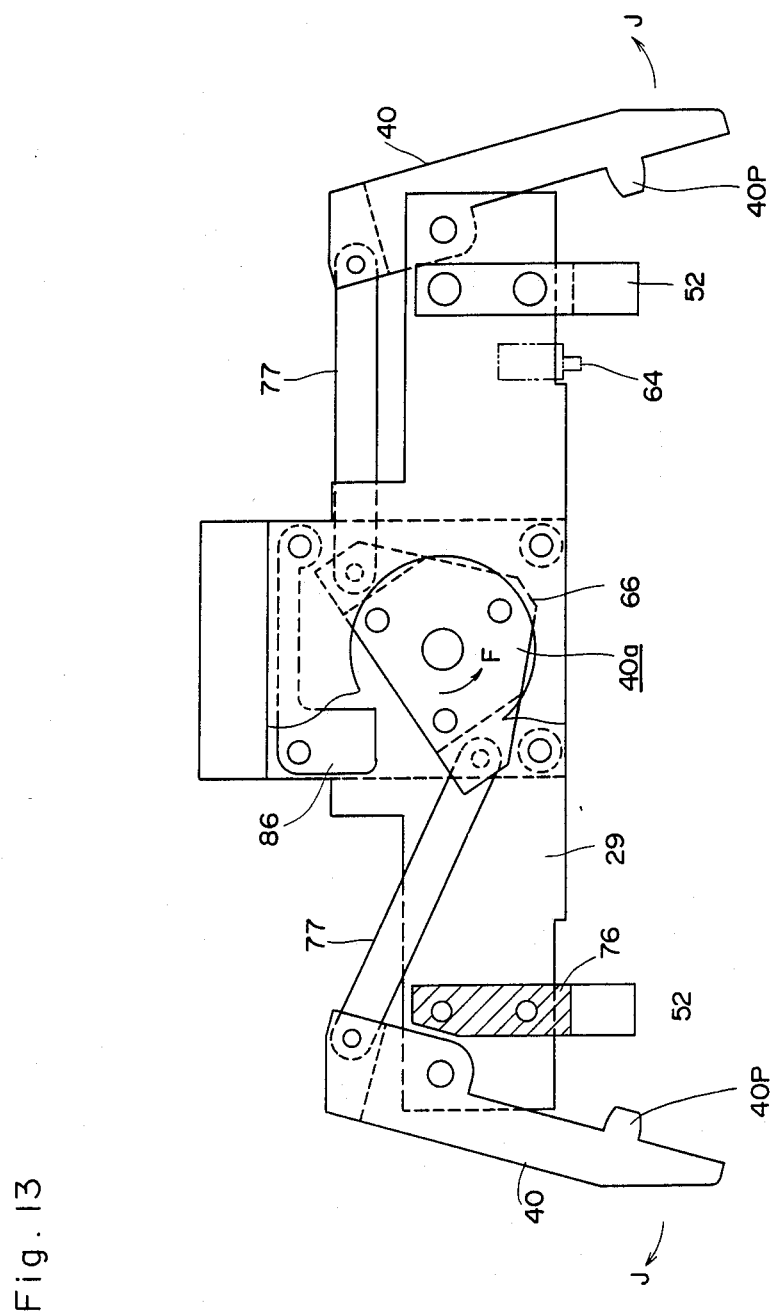

In FIGS. 11, 12 and 13, a pair of clampers 40 comprising two thin plates, are put between the moving members 29, mounted rotatably thereon through pins 85 respectively, and mounted at the reverse side to the retaining portion rotatably on links 77 through pins 84 respectively, the links 77 being connected to the swinging lever 66 through pins 83 respectively.

In FIG. 11, the swinging lever 66 is rotated by a spring force of the swinging motor 44 in the direction of the arrow G and abuts against a stopper 86, and at this time the center of rotation of swinging lever 66, the center of each pin 83, the axis of rotation of swinging lever 66 and the center of each pin 84 are adapted to be aligned. This is of toggle link construction to open and close the right and left clampers 40 simultaneously and symmetrically. Such construction, even when the moving member 29 quickly moves by the laterally moving means in the direction of the arrow K, prevents the clampers 40 from opening due to the inertial of cartridge 1. In other words, the cartridge 1 is completely clamped by the guides 53 provided at the open end of holder 28, guides 52 provided at the moving member 29, and the clampers 40.

FIG. 13 shows the state where the swinging lever 66 is rotated by a predetermined angle in the direction of the arrow F so as to open the clampers 40 in the directions of the arrows J. In addition, reference numerals 76 designate pushers, each of which, while pushing at the front thereof the front surface of cartridge 1, inserts it into the stoker 2 or the recording and reproducing system 3.

Figure 14:
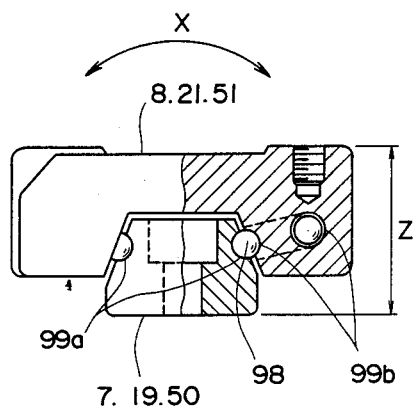
FIGS. 14 and 15 are an elevation and a side view of a cross roller bearing used as a guide mechanism.
Figure 15:
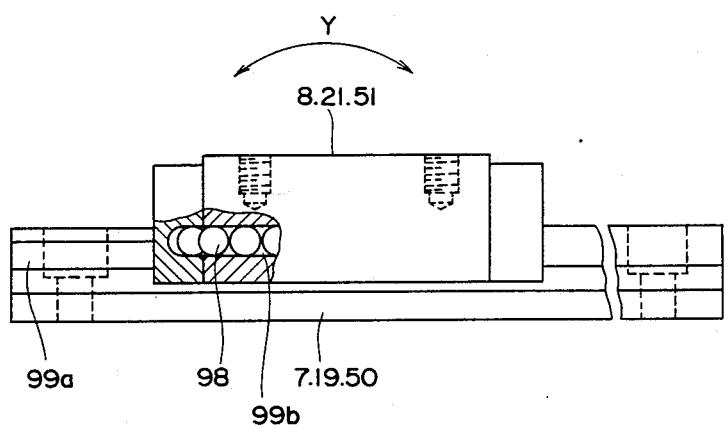

Direct operating guide units shown in FIGS. 14 and 15 are used for all the vertical movement, lateral movement and longitudinal movement necessary for the pick-up and discharge mechanism.

In the drawings, the guide unit is small in a mounting height and strong against loads in the directions of the arrows X and Y, and grooves 99a at the rails 7, 19 and 50 sides and those 99b at the sliders 8, 21 and 51 sides are engaged with each other by circulating balls 98, thereby obtaining a mechanism less in vibration even when operated at high speed and small in a driving force by entirely utilizing the merit of high accuracy and light operation. Especially, the direct operating guide units 50 and 51 for longitudinally moving the clamp mechanism provided at the pick-up and discharge mechanism 4 comprise one rail 50 and one slider 51, thereby making lightweight the mechanism 4 itself. This is largely effective in that the laterally and vertically moving power is reduced.

Such direct operating guide unit, even when the mounting accuracy slightly gets out of order, expands a little the open side of each slider 8, 21 or 51, thereby preventing movement resistance from increasing.

The C-frame like members 28a at the holder 28 are provided with limit switches 22a, 22b and 22c for deciding the position of moving member 29.

In detail, the first limit switch 22a detects the position where the moving member 29 is the most apart from the stocker 2 as shown in FIGS. 4 and 5, in other words, the position of the moving member 29 with respect to the holder 28 when the pick-up and discharge mechanism 4 moves while clamping the cartridge 1. Concretely, the limit switch 22a is disposed in proximity to the closed end of holder 28 and operates when the moving member 29 abuts against the rear end of the holder 28.

Figure 16:
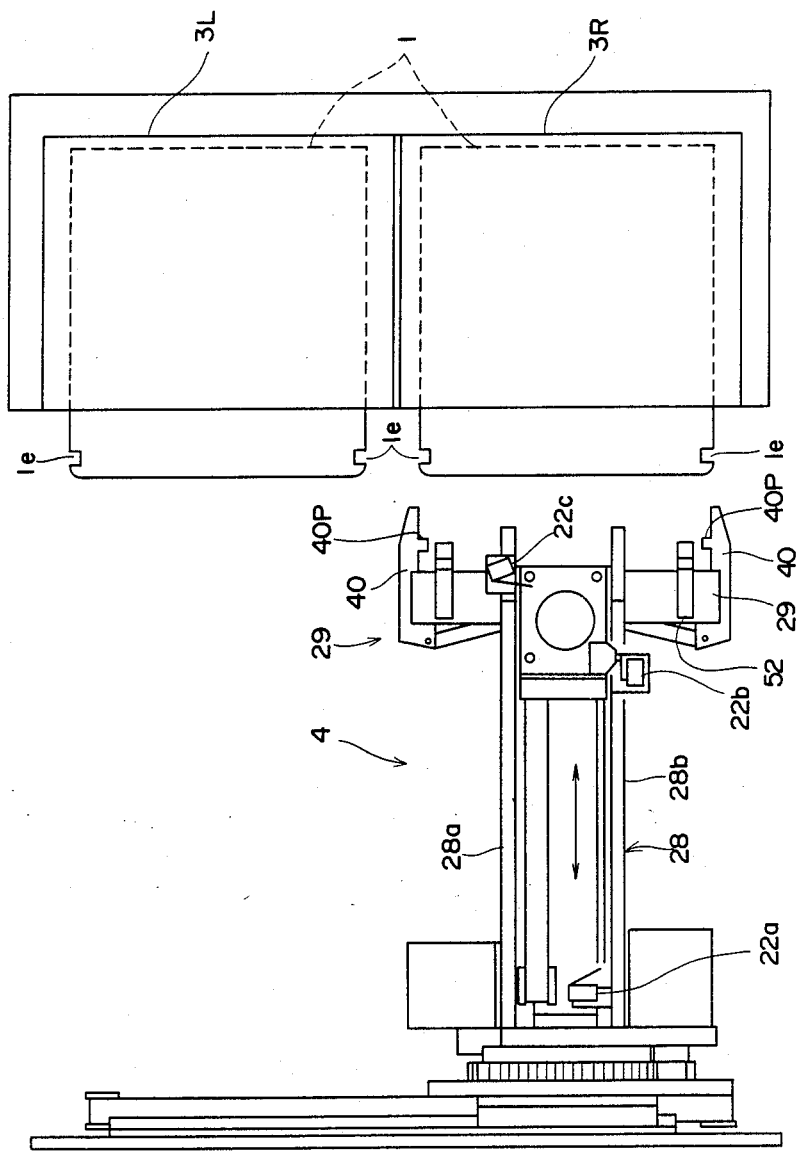
FIGS. 16 and 17 are views exemplary of the positions of the moving holding mechanism.

The second limit switch 22b detects the position of the moving member 29 shown in FIG. 16 when the pick-up and discharge mechanism 4 clamps no cartridge. The position shown in FIG. 16 detected by the second limit switch 22b is the position where without contact between the utmost end of the moving member 29, for example, the clamper 40 and the stocker 2, the pick-up and discharge mechanism 4 is movable in the state of clamping no cartridge. Concretely, the limit switch 22b is disposed a little close to the utmost end of holder 28 and operated when a contact fixed to the moving member 29 abuts against a switch dog.

In the disc file apparatus of the invention, when the pick-up and insertion mechanism clamps no cartridge, the moving member 29 is stand-by at this position, thereby restricting an amount of movement of moving member 29 as small as possible.

Figure 17:
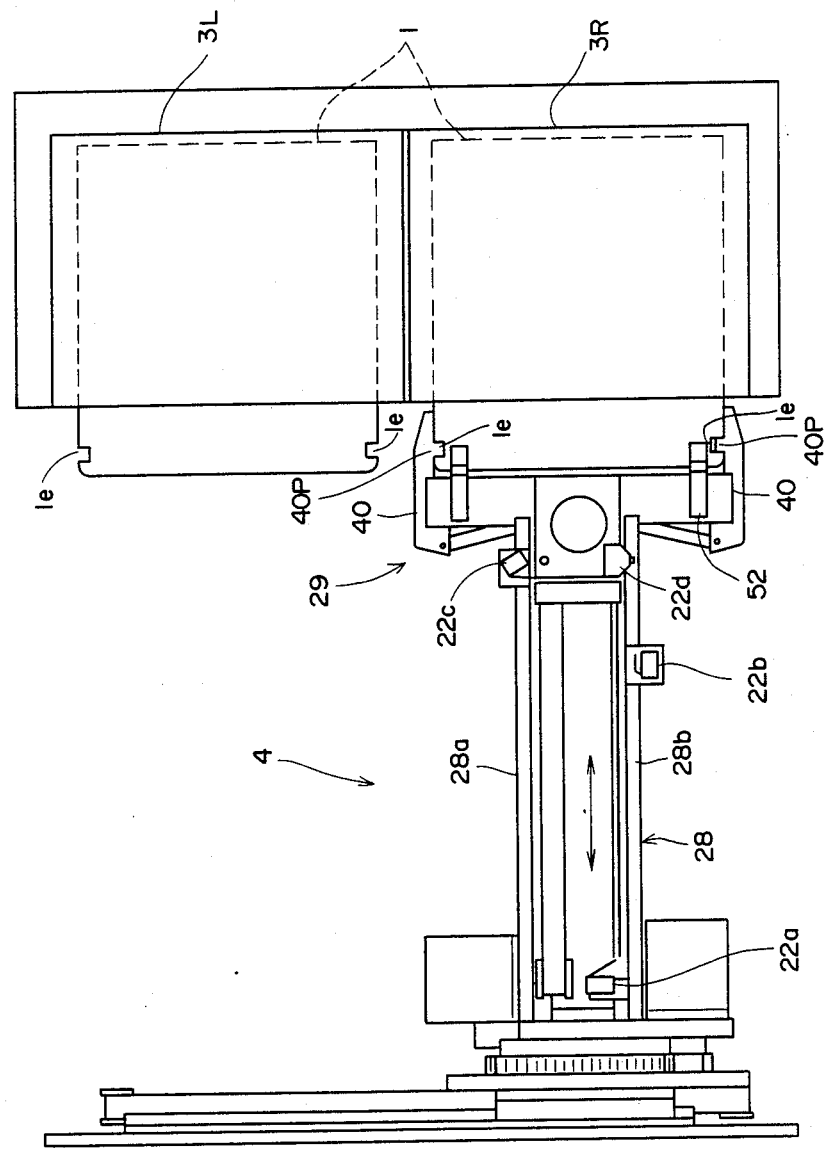

The third limit switch 22c detects the position, shown in FIG. 17, of the moving member 29 for clamping the cartridge 1 by the pick-up and discharge mechanism 4, in other words, the position of the moving member 29 when taking or inserting the cartridge 1 out of or into the stocker 2 or the recording and reproducing system 3 by use of the pick-up and discharge mechanism 4.

In addition, the moving member 29, as above-mentioned, is provided with the sensor 64 for detecting the same approaching the cartridge 1, the sensor 64 and limit switch 22c being more fail-safe when the sensor 64 has priority thereto.

Next, explanation will be given on a transfer mechanism 100 provided at the recording and reproducing system 3 with reference to FIGS. 18 and 19.

In addition, the transfer mechanism 100 is omitted in FIG. 6.

Figure 18:
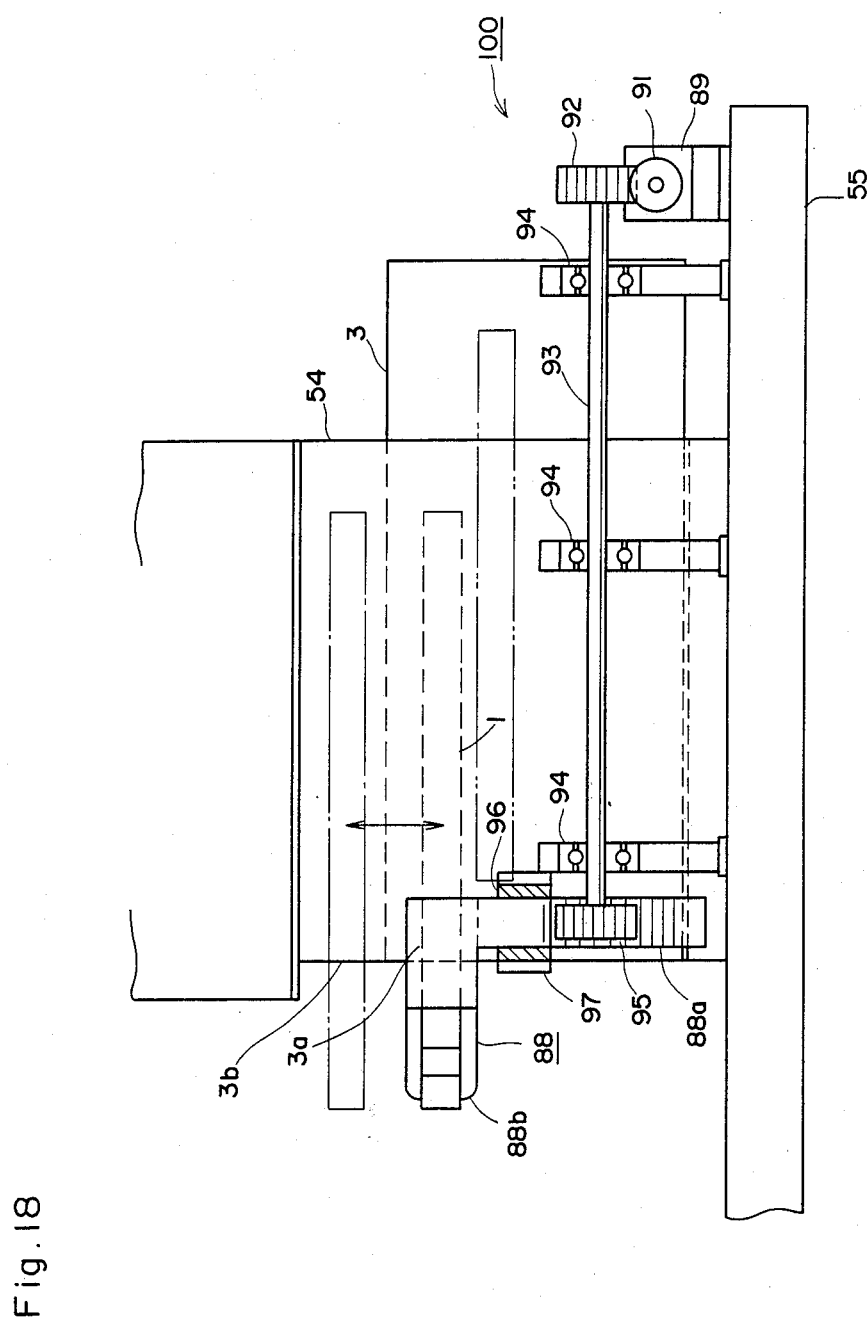
FIGS. 18 and 19 are side views of structure of a transfer mechanism when viewed in two directions.

Referring to FIG. 18, the transfer mechanism 100 functions to lift the cartridge 1 returned to the insertion/discharge port 3a from the inner of the recording and reproducing system 3 and move it to the take-out port 3b at the upper portion of the recording and reproducing system 3 as shown with the one-dot chain line. The reason for this is that the cartridge 1 having completed recording or reproducing, when replaced to new one, is on standby at the place where new one is not hindered from insertion into the recording and reproducing system 3, and at the time the new one is fed thereto.

In FIG. 18, lift levers 88 for lifting the cartridge 1 are provided at both sides of the recording and reproducing system 3 in a manner that the lift levers 88 laterally sandwich therebetween the cartridge 1. The lift lever 88 comprises an arm 88a having a rack for vertical movement and a lug 88b for supporting the cartridge 1 vertically and laterally, the lug 88b being provided with a groove through which the cartridge 1 is vertically and laterally supported and longitudinally guided, and open at the utmost end in the vicinity of each recess 1e at the cartridge 1 so that the clampers 40 at the moving member 29 may clamp the same.

The left and right lift levers 88, when the cartridge 1 is returned to the insertion/discharge port 3a at the recording and reproducing system 3, simultaneously rises to the take-out port shown in the one-dot chain line. After the lift levers 88 rise, the next cartridge 1 is inserted into the insertion/discharge port 3a, and at that time, as shown in FIG. 19, since the arm 88a is positioned outside the recording and reproducing system 3, there is no fear that the cartridge 1 contacts with the lift lever 88. Also, after the next cartridge 1 is taken-in by take-in means (not shown) provided within the recording and reproducing system 3 toward the position shown with the two-dot chain line where the recording or reproducing is possible, the left and right levers 88 fall to the original position. Also, in this case, since the lift levers 88 vertically move near the insertion/discharge port 3a of the recording and reproducing system 3, there is no fear that the levers 88 contact with the cartridge 1.

Next, explanation will be given on a mechanism which vertically moves the lift levers 88. In FIG. 19, a reference numeral 89 designates a motor having at both sides shafts 89a, the shafts 89a being supported by bearings 90 and having at both ends worm gears 91 respectively. In FIG. 18, worm wheels 92 are mounted at one ends of shafts 93 to transmit a torque of the motor 89 to the shafts 93 respectively. The two shafts 93 are provided at both lateral sides of recording and reproducing system 3, simultaneously rotate by rotation of motor 89, are supported by bearings 94, and carry at the other ends pinions 95 respectively. The arm 88a at each lift lever 88 has a rack in engagement with the pinion 95, whereby the two shafts 93 rotate to simultaneously vertically move the two lift levers 88. In addition, a square slider 96 for guiding each lift lever 88 in vertical movement is mounted on a frame 54 through a mounting base 97.

Next, explanation will be given on operation of the disc file apparatus of the invention. The main operation of the disc file apparatus of the invention is to selectively pick up the cartridge 1 from the stocker 2 and insert it into the recording and reproducing system 3 or reversely to return the cartridge 1 to the original position. It is important for the disc file apparatus of the invention not to destroy the information recorded in the disc 1d in the cartridge 1. It is bad for the cartridge 1 to be subjected to an impact or excessive vibrations during the transportation. It is also important to read many information in a short time, whereby it is an important function to increase the transportation speed, that is, to reduce an access time to the cartridge 1.

Next, explanation will be given on the operation that the cartridge 1a shown in FIG. 4 is picked up and inserted into the recording and reproducing system 3L. The apparatus of the invention at first is given a command that the cartridge 1a is taken out of the stoker 2 and inserted into the recording and reproducing system 3L at the left side, and at that time the moving member 29 is positioned as shown in FIG. 16. The lifting motor 10 and laterally moving motor 13 are driven by a controller (not shown) housed in the apparatus of the invention, so that the pick-up and insertion mechanism 4 is moved until its take-up center is opposite to and aligned with the center of the front surface of cartridge 1a, and at that time the position of mechanism 4 is checked by being detected by a scale with a slit and a photoelectric sensor (not shown). All the motors except for the swinging motor 44 use the pulse motor and are moved in the speed pattern in which the utmost end portion of pick-up and discharge mechanism 4 is kept in condition of producing less vibration. Then, the swinging motor 44 for the clamp mechanism 40a provided at the moving member 29 is actuated and the clampers 40, as shown in FIG. 13, are open and simultaneously the motor 31 is driven, so that the moving member forwardly moves toward the cartridge 1a, the guides 52 provided at the front of the moving member 29 at first engage with the cartridge 1a thicknesswise thereof, and then the sensor 64 detects the front surface of the cartridge 1a to thereby stop the forward movement of the moving member 29.

At this time, the sensor does not operate when no cartridge is in the stocker 2, but the limit switch 22c operates to stop the moving member 29 at the position as shown in FIG. 17.

The swinging motor 44 is deenergized and the clampers 40 are closed by a spring force of the flat spiral spring in the swinging motor 44 so as to engage the projections 40p with the engaging recesses 1e provided at both side surfaces of cartridge 1a and hold it at both side surfaces at the front portion thereof, which is shown in FIG. 14.

Next, when a sensor (not shown) confirms the clampers 40 in condition of closing, the motor 31 reversely rotates to take-in the cartridge 1a from the open end to the closed end, and at that time the cartridge 1a is transported while being kept horizontal by the guides 53 provided at the open end of the holder 28. When the cartridge 1a is taken out to the position shown with the two-dot chain line in FIG. 5, the limit switch 22a operates to drive the motor 10 and laterally moving motor 13, thereby moving the moving member 29 until the take-in center of pick-up and discharge mechanism 4 coincides with the center of the insertion and discharge port of the recording and reproducing system 3. During the movement, a selection command for the surface or the rear of cartridge 1a is given, so that the swinging motor 44, in need, is driven to rotate the pick-up and discharge mechanism 4 at an angle of 180°. Upon completing the movement, the motor 31 is driven to move the cartridge 1a to the position shown in FIG. 17, and at that time the cartridge 1a is pushed by the pushers 76 provided at the front of th moving member 29, so that a gap is produced between each projection 40P at the clamper 40 and each recess 1e at the cartridge 1a, because the clampers 40 lightly open, which result in that the capacity of the swinging motor 44 is reduced.

Then, the cartridge 1a moves along the groove of the lift lever 88 at the transfer mechanism 100 and inserted into the recording and reproducing system 3 through the cartridge insert and discharge port thereof.

When the cartridge 1a forwardly moves to be inserted into the recording and reproducing system 3, a sensor (not shown) provided therein operates to stop the motor 31 and simultaneously the singing motor 44 is energized to make the clampers 40 open. Upon completing the operation of each clamper 40, the motor 31 is reversely rotated to move the clamp mechanism backwardly to the position shown in FIG. 16.

Figure 19:
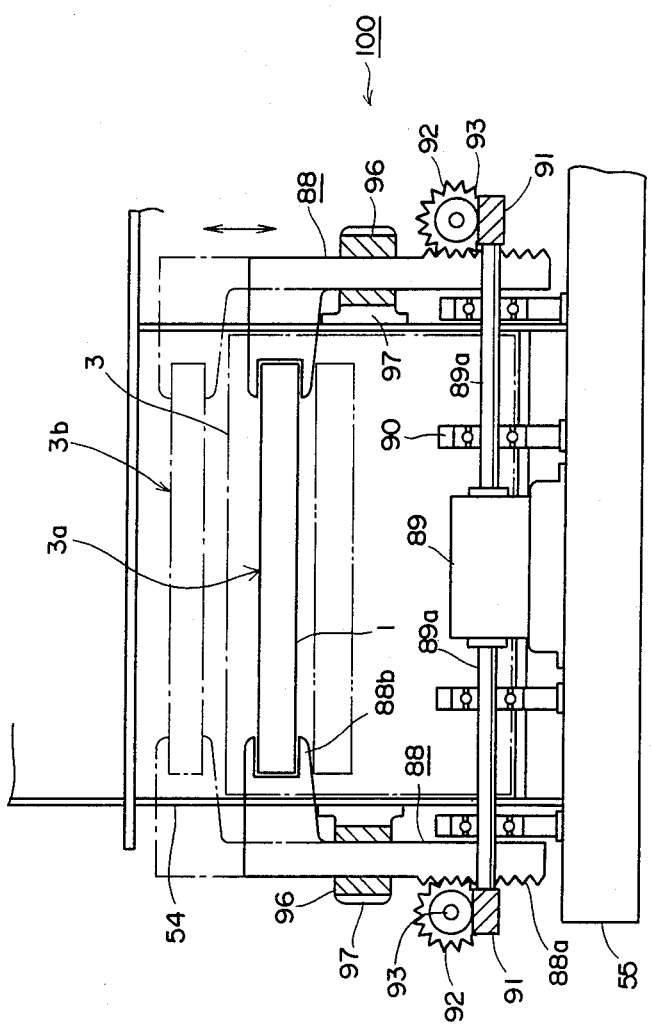

Meanwhile, the cartridge 1a inserted into the recording and reproducing system 3 is further taken in by feed and discharge means (not shown) provided in the recording and reproducing system 3 to the position where the information can be recorded or reproduced in the system 3 as shown with the two-dot chain line in FIG. 18 or 19.

Next, the swinging motor 44 is deenergized and the clampers are closed to be stand-by. When the recording and reproducing system 3 completes its recording or reproducing, a command to return the cartridge 1a to the original position at the stocker 2 is given, and at that time the reverse operation to the above only need be carried out. However, it is different from the above that when the cartridge 1a is inserted into the stocker 2 a sensor 65 provided at the rear thereof detects the rear of cartridge 1a to thereby stop the motor 31. At this time, the cartridge 1a is held its position by holding springs 87, thereby being prevented from escaping from the stocker 2.

Next, explanation will be given on the operation that a command is given to the disc file apparatus of the invention so as to take out a cartridge 1b and insert it into the left side recording and reproducing system 3L while a cartridge 1a has been inserted into the left side recording and reproducing system 3L. While the left side recording and reproducing system 3L is carrying out the recording or reproducing of cartridge 1a, the pick-up and discharge mechanism 4 takes the cartridge 1b out of the stocker 2 and transports it to the insertion/discharage port 3a at the left side recording and reproducing system 3L, thereby being stand-by until the recording or reproducing of cartridge 1a is finished. The operation at this time is the same as that of taking the cartridge 1a out of the stocker 2 and transporting it to the left side recording and reproducing system 3L.

Upon completing the recording/reproducing, the cartridge 1a is discharged from the insertion/discharge port 3a by the feed and discharge means (not shown) provided at the recording and reproducing system 3 and pushed to the lift lever 88. Then, the motor 89 is actuated, the shafts 93 provided laterally at the recording and reproducing system 3 are rotated through the worms 91 and worm wheels 92 respectively, and the two lift levers 88 simultaneously rise through the pinions 95 to the take-out port 3b. Simultaneously, the next cartridge 1b waiting before the cartridge insertion/discharge port 3a at the recording and reproducing system 3 is inserted thereinto.

Next, the pick-up and discharge mechanism 4 takes out the cartridge 1a through the take-out port 3b and then houses it into the stocker 2 at the original position thereof.

The operation at this time only need be reverse to that of inserting the cartridge 1a into the recording and reproducing system 3. Also, after the cartridge 1a is discharged, the motor 89 is reversely rotated to down the lift levers 88 to the position of cartridge insertion/discharge port 3a.

In addition, in a case where a plurality of cartridges 1 are continuously fed to the recording and reproducing system 3, the above operation is repeated.

In addition, the cartridge 1, when inserted into the recording and reproducing system 3, is detected of its insertion by the cartridge sensor CSL, and when discharged from the same, detected if its discharge from the same by the cartridge sensor CSU. Hence, both the cartridge sensors CSL and CSU are checked of detection, whereby it is possible to detect whether or not the cartridge 1 is inserted into the respective recording and reproducing systems 3L and 3R, in other words, whether or not a new cartridge 1 can be inserted into the same.

Figure 20:
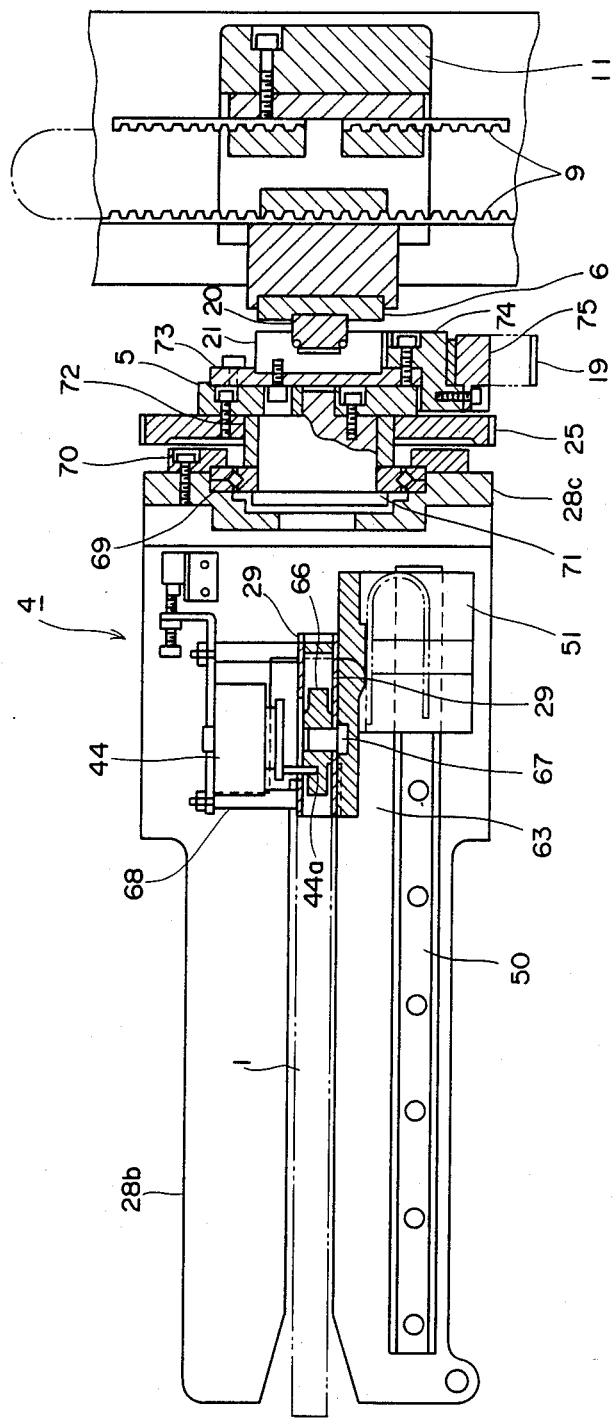
FIG. 20 is a side view of another example of the pick-up and discharge mechanism.

Now, FIG. 20 is a side view of a modified embodiment of the holder 28, corresponding to FIG. 11.

As shown in FIG. 20, a C-frame like member 28b (as well as that 28a) constituting the holder 28 has an opening of width slightly larger than a thickness of cartridge 1 and is tapered inwardly at the opening end.

Accordingly, the opening at the C-frame like member 28b (as well as that 28a) serves to guide the cartridge 1 thicknesswise thereof when taken in by the moving member 29 into the holder 28, and makes it smooth to take the cartridge 1 therein.

Also, the opening of the member 28b (as well as that 28a) is of width somewhat larger than a thickness of the moving member 29 so as to serve as a passage through which the moving member 29 moves between the open end and the closed end of the C-frame like member 28b.

In addition, the holder 28 of such construction is basically the same as that in the aforesaid embodiment.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A disc file apparatus comprising:
   at least one stocker for housing, in juxtaposition with one another, a plurality of cartridges each housing therein an information storage medium and each having two lateral sides having recessed engaging portions, respectively;
   at least one recording and reproducing system disposed in such a manner that a first direction of taking and housing said cartridge out of and into said stocker is parallel to the direction of inserting and discharging said cartridge into and from said recording and reproducing system;
   a carriage guided along rails extending in a second direction in which said cartridges are juxtaposed in said stocker; and
   pick-up and discharge means, supported by said carriage and including a cartridge holder to hold said cartridge, for moving said cartridge holder in the first direction so as to pick-up said cartridge from said stocker, for inserting said cartridge into an insertion/discharge port of said recording and reproducing system, for removing said cartridge when discharged from said recording and reproducing system, for housing said cartridge into said stocker at a predetermined position therein, and for turning over said cartridge;
   said cartridge holder being substantially C-shaped with one end being open and another end being closed, said open end being opposable to a front surface of a cartridge housed in said stocker to receive a middle portion of said cartridge excluding the lateral side portions thereof, said closed end being supported by said carriage so as to be rotatable around an axis parallel to the first direction to turn over said cartridge;
   a moving member provided on said pick-up and discharge means and movable in parallel to the first direction between said open end and said closed end of said cartridge holder; and
   a clamping mechanism mounted on said moving member and engageable with said recessed engaging portions of said cartridge, thereby clamping said cartridge.

2. A disc file apparatus according to claim 1, wherein said moving member has a first guide which is open at a distal end thereof an amount slightly greater than a thickness of said cartridge in order to guide an end of said cartridge opposite to said pick-up and discharge means, and wherein
   said cartridge holder has at said open end second guides formed of an elastic material for holding therebetween said cartridge.

3. A disc file apparatus according to claim 1, wherein said moving member has a guide which is open at a distal end thereof by an amount slightly greater than a thickness of said cartridge so as to guide one end of said cartridge opposite to said pick-up and discharge means, and wherein
   said cartridge holder has a slit having a width slightly greater than a thickness of said cartridge and guides said cartridge lengthwise thereof through said slit and holds said cartridge; and
   said clamping mechanism forms an opening slightly wider than a lateral width of said cartridge to admit and claim the cartridge at both lateral sides thereof.

4. A disc file apparatus according to claim 1, wherein said cartridge holder is supported by said pick-up and discharge means through a cross roller bearing.

5. A disc file apparatus according to claim 1, wherein each of said rails is convex in cross section and has a lengthwise groove at both side slopes of said convex shape, and
   further comprising means for moving said carriage along said groove.

6. A disc file apparatus according to claim 5, wherein said guide means comprises sliders each having a projecting part so as to oppose said groove on a respective one of said rails and provided with an annular circulating route; and a plurality of balls movable on said circulating route, at least one of said balls always abutting against said groove at said rail.

7. A disc file apparatus according to claim 1, wherein said second direction is vertical, and
   said rails are disposed at the left and right sides and extending in parallel to each other in said second direction.

8. A disc file apparatus according to claim 1, wherein said cartridge holder has a center of gravity different from a center of rotation thereof and is provided with means for regulating rotation thereof so that the center of gravity thereof is movable only in a range at an angle of 180° and above the horizontal line passing said center of rotation.

9. A disc file apparatus according to claim 1, wherein said recording and reproducing system is provided with means detecting whether cartridge is within said recording and reproducing system.

10. A disc file apparatus according to claim 1, wherein said cartridge holder is provided with means which, when said clamping mechanism clamps no cartridge, places said moving mechanism in a stand-by position on said cartridge holder where the front member of said moving member does not contact with said cartridge within said stocker.

11. A disc file apparatus according to claim 10, wherein said means for stand-by comprises is a limit switch mounted on said cartridge holder so as to detect the relative position of said moving member to said cartridge.

12. A disc file apparatus according to claim 1, wherein said recording and reproducing system is provided with transfer means for transporting a first cartridge discharged from said insertion/discharge port of said recording and reproducing system to a predetermined position above said port, and where after said first cartridge is transported to said predetermined position, the pick-up and discharge means inserts another cartridge into the recording and reproducing system and thereafter moves to receive said first cartridge.

* * * * *